March 26, 1957  E. J. HUME  2,786,933
ELECTRIC ARC WELDING
Filed Dec. 19, 1955  3 Sheets-Sheet 1

INVENTOR
E. J. HUME
By Young, Emery & Thompson
ATTYS.

March 26, 1957 — E. J. HUME — 2,786,933
ELECTRIC ARC WELDING
Filed Dec. 19, 1955 — 3 Sheets-Sheet 2

INVENTOR
E. J. HUME

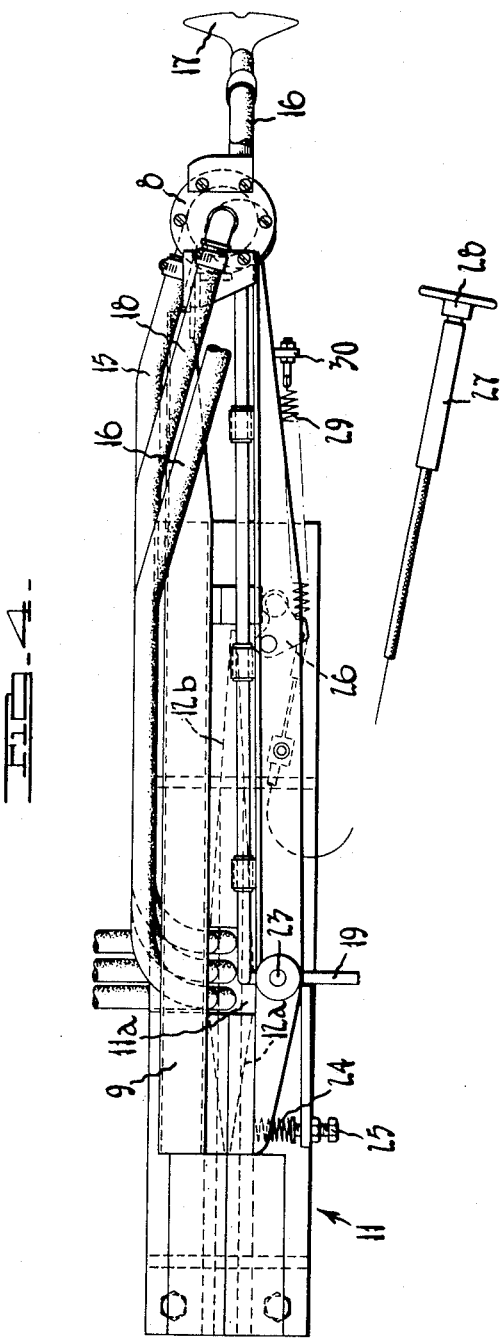

United States Patent Office 2,786,933
Patented Mar. 26, 1957

2,786,933

ELECTRIC ARC WELDING

Ernest Jeremy Hume, Carnegie, Victoria, Australia, assignor to Humes Limited, Melbourne, Victoria, Australia, a company of Victoria Application December 19, 1955, Serial No. 553,939

Claims priority, application Australia December 30, 1954

7 Claims. (Cl. 219—60)

This invention relates to electric arc welding and has particular application to the internal welding of longitudinal seams of pipes and such like bodies made from steel plate.

It is frequently desirable to form such seams internally of pipes or pipe bodies of relatively small diameter, say, from twelve or eighteen inches or thereabouts, in which it is not feasible or convenient for the operator to conduct or supervise welding operations inside the pipe itself.

The primary object of this invention is to provide improved apparatus whereby such internal welding operations can be carried out most efficiently and conveniently in that it becomes possible for an operator readily to observe and control the welding operations from an external position.

According to the invention, provision is made for supporting within the interior of the pipe body being internally welded, a hopper for containing and feeding flux powder to the welding zone, while various tubes or conduits for conveying the flux powder to and from the hopper and if desired from the interior of the welded body and a remotely located storage hopper, as well as a tube through which the electrode is fed to the work are arranged so as to extend within the interior of the pipe body by way of the gap that exists between the two edges of the shaped steel plate which is being internally welded into the form of a pipe.

The foregoing and other objects and salient features of the invention and the advantages arising therefrom will be readily appreciated from the following description aided by reference to the accompanying drawings, in which—

Figure 4 is a plan view.

Figure 1:
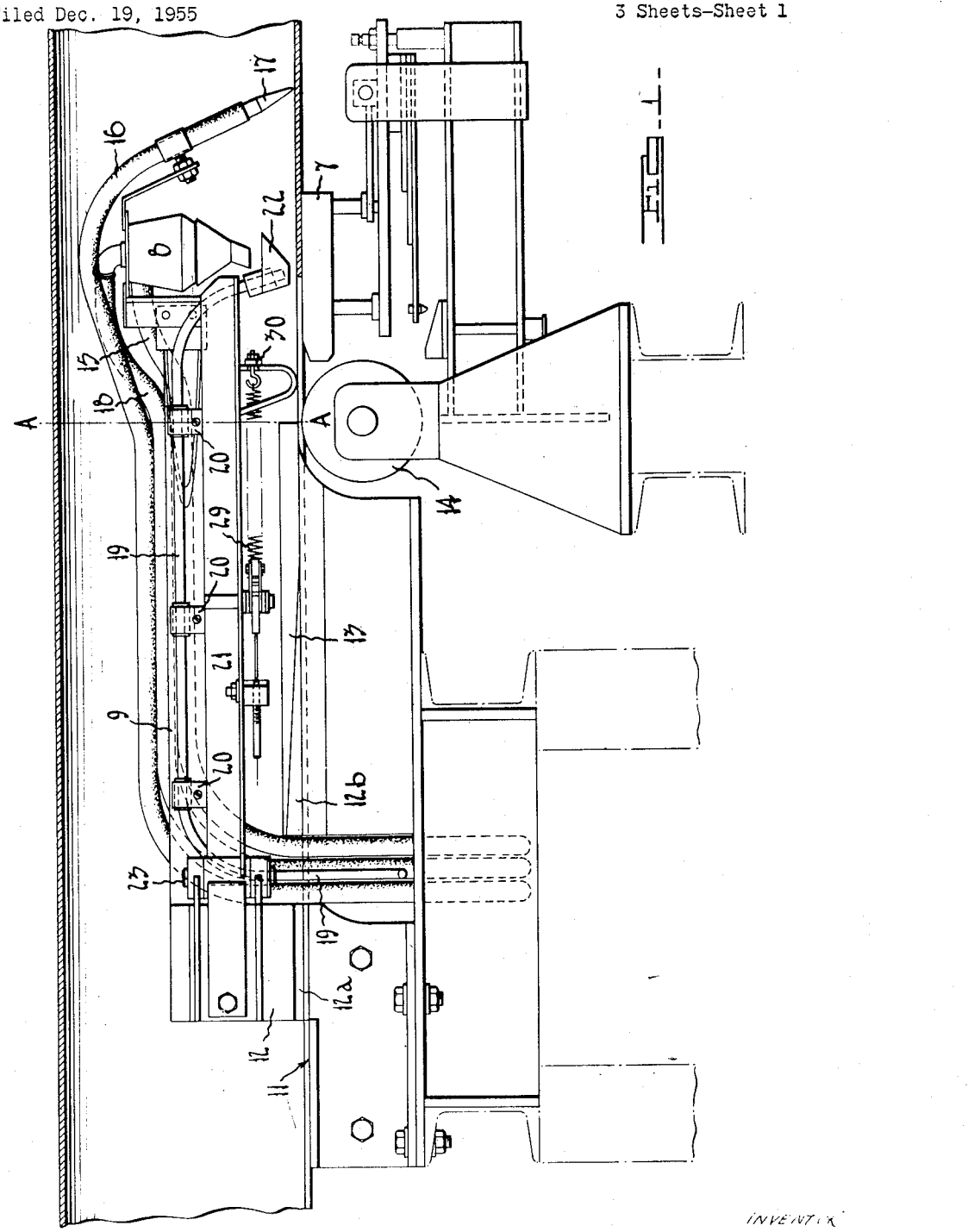
Figure 1 is a side elevation of an apparatus embodying one practical form of the invention.

In accordance with such an embodiment it will be assumed that the steel plate has been fashioned in some suitable way into a shape closely approaching the cylindrical but with a gap of moderate width between the two longitudinal edges, which are disposed lowermost and that some suitable provision is made for traversing the pipe body lengthwise past the tip of a fusible electrode which is in vertical alignment above the welding line.

The apparatus includes suitable means for progressively bringing the pipe body into cylindrical shape with the longitudinal edges in abutting relationship at an appropriate distance in advance of the electrode. A pair of closing rolls of approximately semi-circular, concave, profile disposed at opposite sides of the pipe body are preferably employed for such purposes. Such closing rolls are indicated by broken lines 6 in Figure 2, and they may be supported about a vertical axis represented by dot-dash line A—A in Figure 1.

A backing member 7 of any known or suitable form, and preferably water cooled, is arranged to contact with the under side of the pipe body beneath the welding tip of the electrode and in line with the seam joint being welded, and this backing member may be adjustably or resiliently mounted so that it bears upwardly against the pipe with a desirable pressure.

A hopper 8 for containing a supply of flux powder to be fed to the welding zone is disposed within the pipe body and is advantageously of a construction and form as disclosed in our copending application Ser. No. 553,938, entitled "Improvements Relating to Flux Feeding Systems for Electric Welding."

This feed hopper may be supported in position by a cantilever arm or beam 9 which extends forwardly from the hopper (i. e. towards the unclosed end of the pipe body) and is attached at its forward end to a supporting structure, indicated generally at 11, having a portion that projects through the gap between the longitudinal edges of the pipe body into the interior thereof. This supporting structure may include a vane or like member 12 which extends lengthwise adjacent the longitudinal edges of the pipe body to a point near the closing rolls and assists in guiding the pipe body during its traversing movement. This vane may have a wedge formation 12a at its forward end to ensure that a gap of adequate width exists between the longitudinal edges of the pipe body for the passage therebetween of certain tubes shortly to be described.

This vane may also have an oppositely directed wedge formation 12b which, in conjunction with a longitudinally elongated shoe 13 extending within the pipe body, the closing rolls 6 before referred to and roller 14, ensures that the longitudinal edges of the pipe body will be properly abutted by the time that they arrive at the welding zone.

Three service or delivery tubes 15, 16 and 18 extend within the pipe body and pass out therefrom through the aforesaid narrow gap between the longitudinal edges of the pipe body. Thus, the tube 15 conveys the flux laden air stream from a remotely located storage hopper (not shown) to the feed hopper 8. Tube 16 is for conveying excess or surplus powder from a fish tail or other suitable pick-up nozzle 17 located somewhat rearwardly of the welding zone to the storage hopper, and tube 18 is for conveying air with possibly some excess powder from the top of the feed hopper 8 into the upper part of the storage hopper, as disclosed in our said copending application. A tube 19 through which the fusible electrode is fed to the work also enters the pipe body through said gap and may be supported by brackets 20 on another cantilever arm 21. Tube 19 may terminate at one end in a director 22 disposed beneath the outlet of the feed hopper 8.

Internal welding of the longitudinal seam may proceed automatically under the control of an operator located at some convenient position externally of the pipe. It is highly desirable that the operator should be able to adjust the position of the electrode tip to ensure that it closely follows the desired line of welding. For this purpose the cantilever beam 21 for supporting the electrode tube 19 may be pivotally mounted at its front end about a vertical pivot pin 23 and biased transversely in one direction by spring 24, the force of which is adjustable by the screw and nut device 25.

A spring influenced cam or like device 26 operable by a screw and nut device 27 and a handwheel 28 supported in some suitable position for manipulation by the operator may be provided to move the beam 21 in the other direction about its pivot pin 23.

Control of the cam device 26 may be effected by a "Bowden" wire or flexible line connected at one end to the cam device 26 and extending preferably through a flexible conduit and around suitable guides to the screw and nut device 27. A tension spring 29 extends between the cam device and the terminal post 30.

To assist the operator in observing the internal welding operations, a suitable optical system of mirrors, prisms, or the like (not shown) may be provided.

Figure 2:
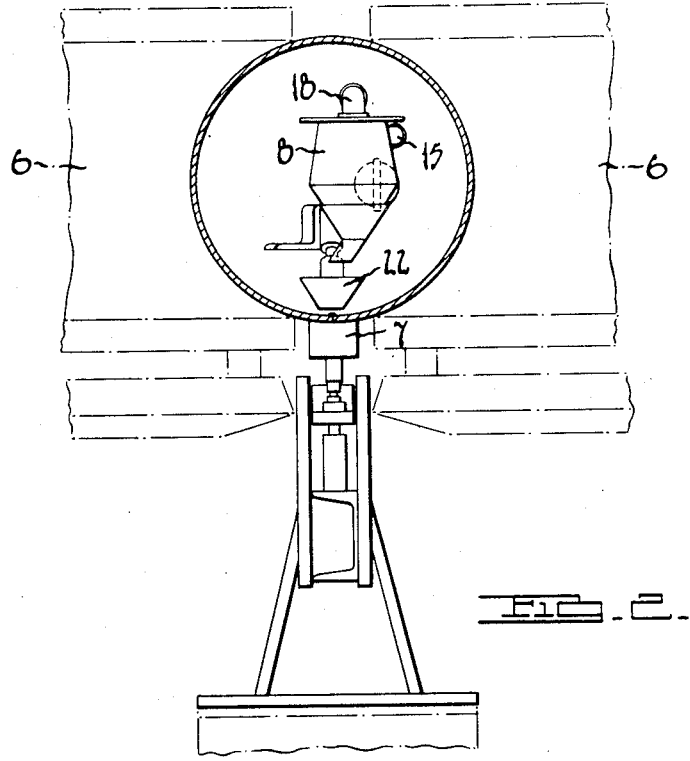
Figure 2 is a view looking at the right hand end of Figure 1.
Figure 3:
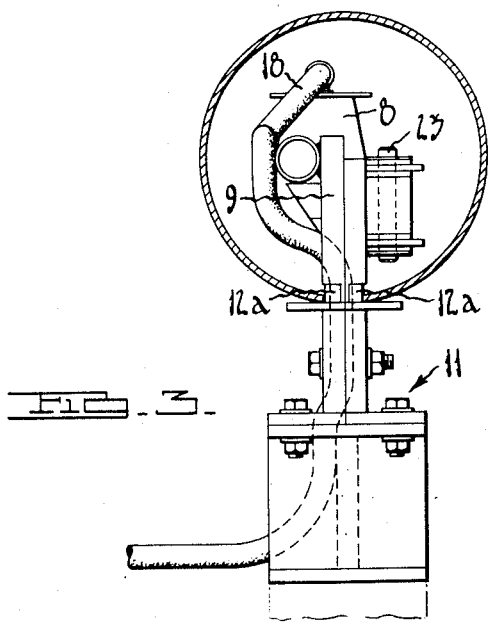
Figure 3 is a view looking at the left hand end of Figure 1.

The tubes 15, 16, 18 and 19 pass downwardly from the interior of the pipe body through an aperture 11a in the supporting structure as will appear from Figures 1 and 4.

Having now described my invention what I claim as new and desire to secure by Letters Patent is:

1. Improvements in apparatus for electrically welding the abutted longitudinal edges of relatively small diameter pipe bodies being formed from steel plate wherein the plate fashioned into an approximately cylindrical body with the two longitudinal edges lowermost is traversed lengthwise in relation to a welding electrode disposed within the body, comprising in combination, means for ensuring that a gap of not less than a predetermined width is maintained between said longitudinal edges until they are within a predetermined distance of the electrode, means for bringing said body into substantially cylindrical condition with its longitudinal edges abutted before they reach the electrode, a small feed hopper located within the pipe body for containing and feeding flux powder to the internal welding zone, supporting means for said hopper passing through said gap from the interior to the exterior of the pipe body, and tubes for conveying the flux powder to and from the feed hopper from and to a remotely located storage hopper, said tubes extending from the feed hopper to the storage hopper by way of said gap.

2. Improvements in apparatus as claimed in claim 1, wherein another tube for conveying surplus flux powder from the interior of the welded body to said storage hopper extends from the interior of the body to said storage hopper by way of said gap.

3. Improvements in apparatus as claimed in claim 2, wherein another tube for guiding the electrode to the welding zone extends within the pipe body and passes to the exterior thereof through said gap.

4. Improvements in apparatus as claimed in claim 3, wherein said supporting means for the feed hopper includes a cantilever beam extending lengthwise within the pipe body, said feed hopper being attached to the free end of said beam, the other end of the beam being attached to a rigid supporting member that extends through said gap.

5. Improvements in apparatus as claimed in claim 1, wherein said means for maintaining a gap of not less than a predetermined width between the longitudinal edges of the pipe body consists of a member of said hopper-supporting means, said member having a wedge shaped portion which increases in width in the direction of travel of said pipe body and is located between said longitudinal edges.

6. Improvements in apparatus as claimed in claim 3, wherein said tube for guiding the electrode is supported by a cantilever beam extending lengthwise within the pipe body and pivotally mounted at one end upon a member of a supporting structure that extends through said gap, means for biasing said beam transversely in one direction, and manually operable means acting in opposition to said biasing means so that the operator may ensure that the arcing tip of the electrode closely follows the desired line of welding.

7. Improvements in apparatus according to claim 6, wherein said biasing means includes a spring tending to urge said beam about its pivot, and a cam device operable by a hand control member.

References Cited in the file of this patent
UNITED STATES PATENTS

| | | |
|---|---|---|
| 2,187,786 | Jacobus | Jan. 23, 1940 |
| 2,259,976 | Howard | Oct. 21, 1941 |
| 2,269,538 | Lewbers | Jan. 13, 1942 |
| 2,591,809 | Hanson | Apr. 8, 1952 |